United States Patent

[11] 3,625,251

| [72] | Inventor | Vaughn A. Nelson |
| | | Downers Grove, Ill. |
| [21] | Appl. No. | 28,834 |
| [22] | Filed | Apr. 15, 1970 |
| [45] | Patented | Dec. 7, 1971 |
| [73] | Assignee | International Harvester Company |
| | | Chicago, Ill. |

[54] HYDRAULIC COUPLER
3 Claims, 3 Drawing Figs.

[52] U.S. Cl..................................................137/614.04,
137/614.02, 137/614.05
[51] Int. Cl......................................................F16k 15/18
[50] Field of Search............................................137/614.04,
614, 614.01, 614.02, 614.03, 614.05, 614.06

[56] References Cited
UNITED STATES PATENTS

| 2,922,662 | 1/1960 | Hall.............................. | 137/614.04 |
| 3,140,102 | 7/1964 | Johnson....................... | 137/614.04 |
| 3,289,700 | 12/1966 | Gildone........................ | 137/614.04 |
| 3,139,110 | 6/1964 | Bales............................ | 137/614.04 |
| 3,201,151 | 8/1965 | Westveer...................... | 137/614.04 |

Primary Examiner—Samuel B. Rothberg
Assistant Examiner—William H. Wright
Attorney—Floyd B. Harman ABSTRACT: A quick disconnect valved hydraulic coupling characterized in that telescoping components are engaged and disengaged by rotating them with respect to each other. Additionally, means are included that automatically disengage the coupling when an elongating force is applied to a conduit that communicates with one of the telescoping components.

PATENTED DEC 7 1971
3,625,251
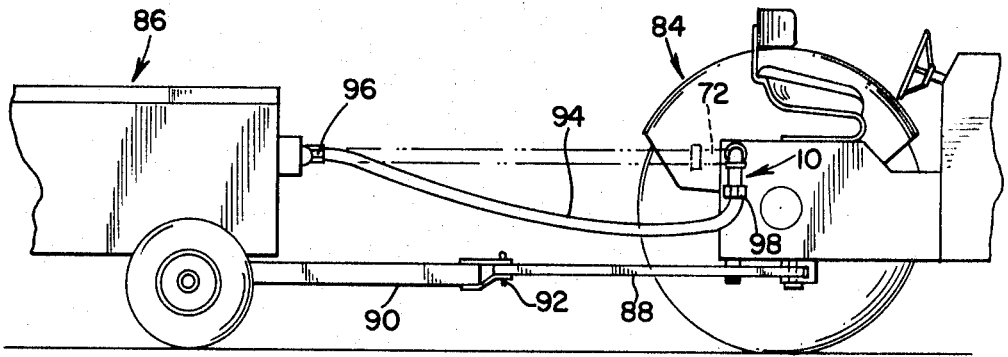
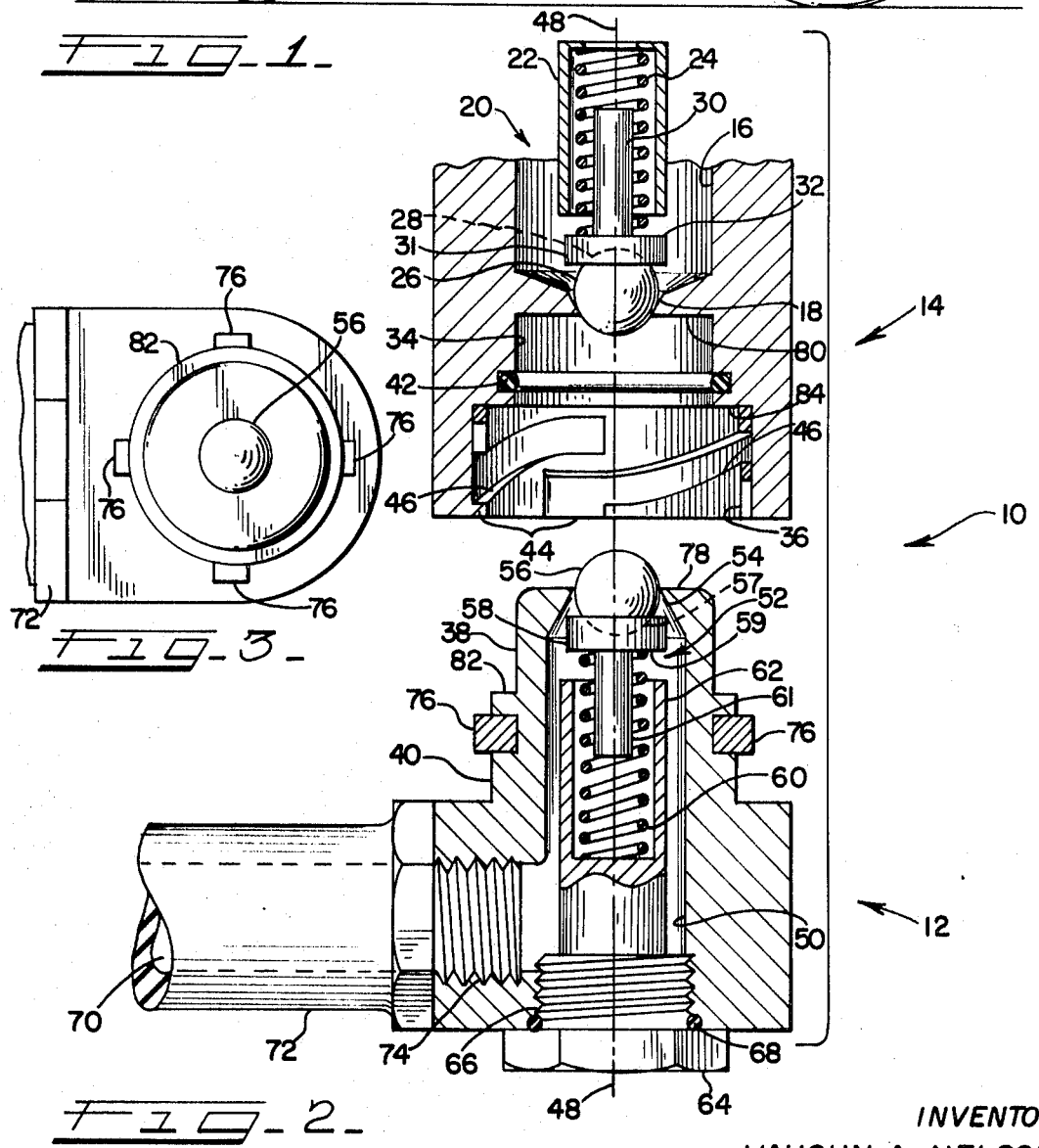
INVENTOR
VAUGHN A. NELSON
BY Dorsey L Baker
ATT'Y.

3,625,251

HYDRAULIC COUPLER

BACKGROUND OF THE INVENTION

This invention relates generally to fluid pressure systems and more particularly to couplings for establishing communication between separate fluid conduits. Further, this invention relates to fluid couplings that may be readily manually connected and that also incorporate a breakaway feature which permits automatic uncoupling when a predetermined force acts on a coupled flexible conduit.

The invention finds greatest applicability in fluid conduit systems that conduct fluid between fixed points that may become separated from one another under conditions that would otherwise apply destructive forces to the conduit therebetween. Although it is not intended to limit the scope of this invention to a particular field of endeavor, agricultural systems have a particular need for couplings of the above-described type and indeed constitute a convenient framework within which to describe this invention.

Many farm implements are designed to be drawn by a vehicle, such as a tractor, and include hydraulic systems operable by fluid pressure. Fluid is generally provided by pump means or the like integral with the tractor and in most instances is conveyed to the trailed hydraulic system by flexible conduit that is separably coupled to a fixed conduit on the tractor. Many implements such as plows, discs, and harrows, among others, incorporate hydraulic adjusting systems; however, for the sake of clarity herein the term "ram" shall be utilized in a generic sense to describe hydraulic systems associated with trailed implements.

As is well known to those familiar with the art, it is often desirable to connect a trailed implement to a tractor while either the ram or the fluid system of the tractor is under pressure. Therefore, hydraulic forces of large magnitude may be present within one or both of the coupling components when the operator is connecting the conduits. In some coupling designs those forces will be sufficient to prevent the operator from easily engaging the coupling and in fact may make engagement impossible.

Another coupling problem that must be overcome results from the relationship between the flexible conduit and the means that provide the trailing force or drawing power to the trailed implement. Normally, the tractor is the driven vehicle and transmits motive power to the trailed implement through a drawbar that is separately hitched by a pin to a tongue extending form the trailed implement. Should the trailed implement encounter an obstacle it may become separated from the tractor as a result of the increased forces acting on the motive power transmission train. Separation can result from many breakages but the most common is destruction of the pin since that is generally the weakest point in the train. Unless the operator senses the disengagement in time to stop the tractor, ultimately the motive forces will be transmitted to the flexible conduit and of course will be sufficient to break it.

Prior art couplings have been characterized by the fact that they have been unable to simply solve either the problem of coupling under pressure or the problem of breaking away. Intricate coupling mechanisms involving many mechanical parts and complex automatic uncoupling systems have been presented but are expensive and subject to deficiencies because of their complexity.

SUMMARY OF THE INVENTION

Accordingly, this invention presents a simplified coupling that incorporates means to facilitate the manual coupling of a pressurized system and likewise to insure the automatic uncoupling of the system upon the application of a predetermined force to the coupled conduit. Male and female coupling components including automatically closing check valves that prevent loss of fluid upon disengagement, are provided with rotational engaging means. In one embodiment, an elongated rigid conduit, angularly related to the axis of rotation and fixedly attached to the free coupling component, serves to facilitate manual coupling and as a means to automatically uncouple the fluid system from a separate vehicle.

BRIEF DESCRIPTION OF THE DRAWINGS

The features of this invention will become more apparent as they are explained in the forthcoming detailed description in conjunction with the drawings in which:

FIG. 1 is an elevational view of an operational system including one form of this invention, showing in phantom a secondary position of the flexible conduit;

FIG. 2 is a sectional view, taken along the horizontal centerline of the coupling disclosing the device as fixed on the tractor; and FIG. 3 is a top view of the male component shown in FIG. 2.

DETAILED DESCRIPTION OF THE PREFERRED EMBODIMENTS

Like reference numerals in the drawings indicate like or corresponding components and FIG. 2 illustrates a preferred form of coupling indicated generally by the numeral 10 constructed in accordance with the principles of this invention. Telescoping male and female members are indicated generally by the numerals 12 and 14, respectively. The female member 14 includes an axial bore 16 for communication at its uppermost end with a fluid source (not shown) and is restricted adjacent its lower end into a configuration that provides a suitable valve seat 18.

A self-closing valve assembly indicated generally by the reference numeral 20 is disposed within the bore 16. Suitable means (not shown) may be provided to support a cylindrical cup 22 within the bore 16. Disposed within the cup 22 is a spring 24 which receives a stem 30 of piston 31 and acts against the top side 32 thereof. A conforming surface 28 of the piston 31 receives a ball 26 that is urged by spring 24 into sealing relationship with the valve seat 18 when, as depicted in FIG. 2, the male and female components 12 and 14 are disengaged.

In like manner the male member 12 has been provided with a self-closing ball valve assembly indicated generally by the reference numeral 52 that seals axial bore 50 when the male and female members 12 and 14 are disengaged or uncoupled. The cylindrical cup 62 is integral with a plug 64 that is rigidly affixed to the male member 12 by threads 66 and sealed by a circumferential seal 68. A spring 60 disposed in the cylindrical cup 62 receives a piston stem 61 and applies a force to the underside 59 of the piston 58. A conforming surface 57 of the piston 58 accepts a ball 56 that is urged into sealing relationship with the valve seat 54.

The disposition of the balls 26 and 56 is such that coupling the male and female members 12, 14 causes them to unseat from their respective valve seats 18, 54 and permit the passage of fluid. To permit coupling, the female member 14 has been provided with coaxial bores 34 and 36 that receive complementarily formed portions 38 and 40 of the male member 12. Within the bore 36, slots 44 have been provided to accept four equispaced lugs 76 (FIG. 3). Entry of the lugs 76 into the slots 44 and counterclockwise rotation of the male member 12 through a predetermined angle (herein depicted as approximately 90°) about rotational axis 48 will cause the lugs 76 to follow the cam surfaces 46 in the bore 36 until the male and female members 12, 14 are properly coupled and the balls 26, 56 have been forced out of sealing relationship with their respective valve seats 18, 54. At this point face 78 of the male member 12 will be adjacent the shoulder 80 on the female member and likewise, flange 82 will be adjacent shoulder 84. They need not be contiguous but should be close enough to one another to provide a tight mechanical union. Fluidically the joint will be sealed by cylindrical surface 38 compressing the circumferential seal 42.

When the male and female members 12, 14 have been coupled, frictional forces between the lugs 76 and the cam surfaces 46 will in many instances be sufficient to maintain the coupled relationship. However, it is obvious that detent means (not shown) or the like could be used to augment the frictional holding forces.

Referring again to the male member 12, an elongated rigid portion 72, including conduit 70 that communicates with bore 50, extends normally from the rotational axis 48. The leftwardmost end is adapted to be coupled to a flexible conduit. The elongated portion 72 is depicted as a separate component attached by threads 74 but could as easily be integral of the male member 12. The elongated portion 72 serves as a moment arm to facilitate manual coupling and provides a convenient mechanism to automatically disengage the coupling members 12, 14. Those functions will be explained at a later point herein.

FIG. 1 illustrates a tractor 84 connected to a trailing implement 86 that includes a ram or other hydraulic motor (not shown). The motive connection consists of a drawbar 88 and a tongue 90 separably connected by a clevis pin 92. The ram is connected to a fluid energy source (not shown) on the tractor 84 through the coupling 10 and a flexible conduit 94 attached to the implement 86 at 96.

Although not illustrated in detail in FIG. 1, the coupling 10 is the same as illustrated in FIGS. 2 and 3, the female member 14 being rigidly affixed to the tractor 84 and the male member 12 being engaged with the female member. The rotational axis about which the members 12, 14 may be rotated relative to one another extends substantially perpendicularly to the straight line travel path of the tractor 84. However, it is apparent that other angular dispositions would be satisfactory. Conduit 72 extends downwardly and is connected at 98 to the flexible conduit 94.

The breakaway feature of this invention is implemented when some portion of the motive connection, for example, the clevis pin 92 is broken or for some other reason is not in place. If the tractor 84 moves ahead, the distance separating it from the implement 86 will increase, taking up the clack in conduit 94 and eventually stressing it. That force acts on conduit 72 and causes the male member 12 to rotate clockwise until the flexible conduit 94 and the male member 12 reach the position shown in phantom in FIG. 1. At that point the male member 12 has rotated approximately 90° in clockwise fashion and accordingly the lugs 76 will be aligned with slots 44. Upon reaching that alignment, the male member 12 is free to break away from the female member 14.

Ejectment may be facilitated by constructing the male and female members such that when they are assembled to the point that the lugs 76 are at the bottom of the entry slots 44, the balls 26, 56, are in contact and the springs 24, 60 are under compression or preload. Such compression will manifest itself as a separating force when the male member 12 is rotated to that point during an uncoupling operation.

It is apparent that conduit 72 acts as a moment arm about axis 48. Accordingly, it greatly facilitates manual coupling when the fluid within it is under pressure. Of course, the further conduit 72 extends from the axis the greater its moment multiplying effect, but a convenient length for purposes of illustration is about 10 inches–12 inches. Since its effective moment multiplication is about the axis 48, the conduit 72 has been depicted as being substantially perpendicular thereto. That is its most efficient angle but it is apparent that as long as it is not parallel to the axis some moment multiplication will exist.

The coupling mechanism has been depicted herein as four equally spaced lugs 76 and cooperating cam means 46. It is obvious that other rotational coupling means could be utilized with appropriate modifications. If a different number of lugs were used, for example, the engaging rotation might more easily be diminished and adjustments in the positioning of the female member 14 on the tractor 84 would be necessary such that male member 12 would be ejected at least by the time the flexible conduit 94 was straightened.

Also, the self-closing valves have been depicted in the preferred embodiment as ball valves. Obviously other types of self-closing valves could be utilized so long as they are adaptable to rotational engaging and disengaging of the coupling components.

Furthermore, even though the fixed member has been described as the female, it should be apparent that the fixed member could be the male member and the moment multiplying arm could be affixed to a free female member. Thus, it is clear that the invention does not depend upon an association of the moment multiplying arm with the male member as depicted herein.

Although the moment multiplying-releasing mechanism has been described as a rigid conduit, it is clear that other means that apply the requisite rotational force could be utilized. For example, a tubular sheath could be disposed around the flexible conduit and be connected to the coupling member. Another embodiment could utilize a flexible chain, rope or the like attached to the flexible conduit and appropriately affixed to the coupling member such that the chain transmits the releasing force. The above examples are merely cited to show that the only criticality is the provision of a mechanism that will rotate the coupling member upon extension of the flexible conduit and they should not be read by way of limitation.

Thus a simplified fluid coupling has been described. It may be easily engaged and disengaged when high fluid pressure forces are present within the coupling. Furthermore breakaway features are provided so as to disengage the coupling upon application of force to a conduit connected thereto.

Although the particular embodiment of the present invention has been shown and described in some detail herein, there is no intention to thereby limit the invention to the details of that embodiment. On the contrary, the intention is to cover all modifications, alternative embodiments usages and equivalents that fall within the spirit and scope of the invention as expressed and defined in the specification and the appended claims.

What is claimed is:

1. For a tractor including hydraulic fluid supply means and a trailing implement separately connected to the tractor and including a hydraulic device having a flexible fluid conduit extending to the tractor, coupling means for connecting the tractor hydraulic system to the flexible conduit comprising:

male and female members including self-closing valve means, one of said members being adapted to be fixedly attached to said tractor hydraulic system, the other of said members being substantially L-shaped and adapted at the free end of the longer portion to be attached to said flexible conduit;

said male member having lugs to permit coupling of said male and female members; and said female member having a coaxial bore, said bore being provided with entry slots and cam surfaces to allow entry and rotational coupling with said lugs of said male member.

2. For a tractor including hydraulic fluid supply means and a trailing implement separately connected to the tractor and including a hydraulic device having a flexible fluid conduit extending to the tractor, coupling means for connecting the tractor hydraulic system to the flexible conduit comprising:

male and female members including self-closing valve means, one of said members being adapted to be fixedly attached to said tractor hydraulic system, the other of said members being substantially L-shaped and adapted at the free end of the longer portion to be attached to said flexible conduit;

said male member having lugs to permit coupling of said male and female members; and said female member having a coaxial bore, said bore being provided with entry slots and cam surfaces to allow entry and rotational coupling with said lugs of said male member; and said female member having a circumferential seal for fluidically sealing with the cylindrical surface of said male member.

3. For a tractor including hydraulic fluid supply means and a trailing implement separately connected to the tractor and including a hydraulic device having a flexible fluid conduit extending to the tractor, coupling means for connecting the tractor hydraulic system to the flexible conduit comprising:

male and female members including self-closing valve means, one of said members being adapted to be fixedly attached to said tractor hydraulic system, the other of said members being substantially L-shaped and adapted at the free end of the longer portion to be attached to said flexible conduit;

said male member having lugs to permit coupling of said male and female members; and said female member having a coaxial bore, said bore being provided with entry slots and cam surfaces to allow entry and rotational coupling with said lugs of said male member;

said female member having a circumferential seal for fluidically sealing with the cylindrical surface of said male member;

and means for forcing said male and female members apart.

* * * * *